(12) United States Patent
Baker et al.

(10) Patent No.: US 7,818,676 B2
(45) Date of Patent: Oct. 19, 2010

(54) SYSTEM, METHOD AND PROGRAM PRODUCT FOR A CONTENT VIEWER PORTLET

(75) Inventors: Gregory L. Baker, Lafayette, IN (US); Donald S. Bell, Rogers, AR (US); Yixing Gong, New Britain, CT (US)

(73) Assignee: International Business Machines Corporation, Armonk, NY (US)

( * ) Notice: Subject to any disclaimer, the term of this patent is extended or adjusted under 35 U.S.C. 154(b) by 1384 days.

(21) Appl. No.: 11/232,472

(22) Filed: Sep. 22, 2005

(65) Prior Publication Data

US 2007/0067712 A1 Mar. 22, 2007

(51) Int. Cl.
*G06F 3/00* (2006.01)
(52) U.S. Cl. ...................................... 715/744
(58) Field of Classification Search .................. 715/742
See application file for complete search history.

(56) References Cited

U.S. PATENT DOCUMENTS

| | | | |
|---|---|---|---|
| 6,108,686 A | | 8/2000 | Williams, Jr. |
| 2003/0105840 A1* | | 6/2003 | Mandal et al. .............. 709/220 |
| 2003/0110448 A1* | | 6/2003 | Haut et al. .................. 715/513 |
| 2003/0144892 A1* | | 7/2003 | Cowan et al. .................. 705/8 |
| 2004/0015476 A1* | | 1/2004 | Twaddle ........................ 707/1 |
| 2005/0010963 A1 | | 1/2005 | Zeng et al. |
| 2005/0021532 A1* | | 1/2005 | Ghandour .................... 707/100 |
| 2005/0188051 A1* | | 8/2005 | Sneh .......................... 709/213 |
| 2006/0059125 A1* | | 3/2006 | Yan ............................... 707/3 |
| 2006/0230234 A1* | | 10/2006 | Bentolila et al. ............. 711/133 |
| 2007/0022174 A1* | | 1/2007 | Issa ............................ 709/217 |
| 2008/0034031 A1* | | 2/2008 | Weisbrot et al. ............ 709/203 |
| 2008/0040950 A1* | | 2/2008 | Mariacher .................... 36/113 |

* cited by examiner

*Primary Examiner*—Ryan F Pitaro
(74) *Attorney, Agent, or Firm*—John R. Pivnichny; Law Office of Jim Boice

(57) ABSTRACT

A system, method and program product for creating a customized content viewer portlet from a content viewer portlet template. The system comprises a content viewer portlet template that is imported into a workbench. The content viewer portlet template includes a persistent interface component, a model component, a view component and a controller component. The persistent interface component is configured to connect to and retrieve data from a content management system, with the retrieved data being stored in the model component. The view component is configured to retrieve the data from the model component and to display the data as content items. The controller component is configured to invoke methods to be executed by the persistent interface component and the view component in response to a user request, such that the content viewer portlet template is transformed into the customized content viewer portlet that can be installed into a desired portal.

19 Claims, 6 Drawing Sheets

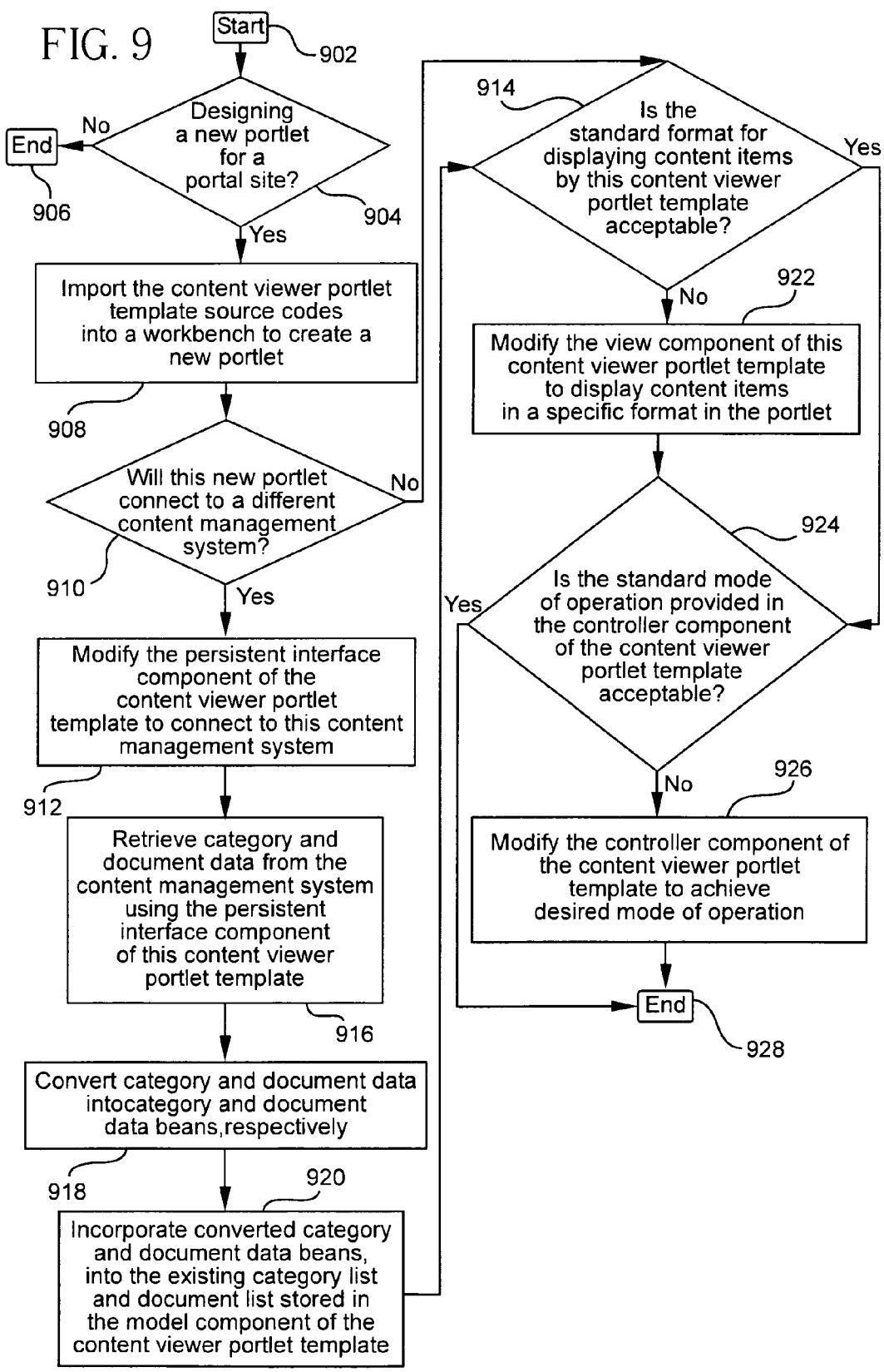

SYSTEM, METHOD AND PROGRAM PRODUCT FOR A CONTENT VIEWER PORTLET

FIELD OF THE INVENTION

The present invention relates to a system, method and computer program product for a content viewer portlet. More particularly, the present invention relates to a system, method and computer program product for creating a customized content viewer portlet from a content viewer portlet template that may be installed in any desired portal web site.

BACKGROUND OF THE INVENTION

A portal or portal web site is at the forefront of today's web technology and is the next generation of desktop. A portal web site may have one or more portlets, which display content items, such as, news, search engines. A portlet is a portable building block or a web component that can be installed into other portal web sites. Often the content items displayed in such portlets are managed by different content management systems. Thus, each time a developer wants to create a new portlet for a portal web site, the developer has to create a portlet application from scratch in order to be able to connect to the content items managed in such content management systems for a given project. As such, developing such a portlet application can be quite complicated and labor intensive. Further, developing such a portlet application can be time consuming and expensive. Moreover, given that developers have different levels of skill sets, may lead to the creation of portlet applications with different approaches, thus, affecting the quality of these portlets.

SUMMARY OF THE INVENTION

In a first aspect of the invention, there is provided a system for creating a customized content viewer portlet from a content viewer portlet template. The system comprises a workbench and a content viewer portlet template that is imported into the workbench. A persistent interface component of the content viewer portlet template is configured to connect to and retrieve requested data from a back-end content management system. A model component of the content viewer portlet template is coupled to the persistent interface component, with the model component having an internal computational representation that correlates to an external taxonomy in a plurality of content management areas. The model component incorporates the requested data retrieved from the back-end content management system into a current set of data beans. A view component of the content viewer portlet template is coupled to the model component. The view component is configured to retrieve the requested data incorporated into the model component and to display the requested data retrieved as one or more content items. Further, a controller component of the content viewer portlet template is coupled to each of the persistent interface component and the view component, with the controller component being configured to invoke a plurality of methods to be executed by each of the persistent interface component and the view component in response to a user request, such that the content viewer portlet template is transformed into the customized content viewer portlet that can be installed into a desired portal. Preferably, the controller component determines whether the model component has the requested data pertaining to the user request, and if the model component has the requested data, the controller component invokes one of the plurality of methods to be executed by the view component to retrieve the requested data from the model component and to display the requested data retrieved as one or more content items, and if the model component does not have the requested data pertaining to the user request, the controller component invokes another one of the plurality of methods to be executed by the persistent interface component to retrieve requested data from the back-end content management system and to store the requested data in the model component. Preferably, the view component of the content viewer portlet template comprises a configuration page containing a plurality of parameters that are modifiable for customizing the content viewer portlet template for installation into the desired portal. More preferably, the controller component of the content viewer portlet template further comprises an exception class for handling exceptions and displaying error messages in multiple languages and a logging interface for displaying debugging messages in one or more log files.

In a preferred embodiment, the requested data retrieved from the back-end content management system comprises of concepts or sub-concepts and files, and the persistent interface component converts the requested data retrieved from the back-end content management system into a new set of data beans and stores the new set of data beans in the model component. The model component incorporates the new set of data beans into the current set of data beans in order to store the requested data retrieved from the back-end content management system, and wherein each of the current and new set of data beans comprises of category data beans and document data beans. Preferably, the view component executes a plurality of JavaServer Page (JSP) files for displaying the requested data retrieved as one or more content items, where any of the plurality of JSP files of the view component of the content viewer portlet template can be modified to display the one or more content items in a specific format in the desired portal. Further, one or more codes of the controller component of the content viewer application template is modified if a particular mode of operation is desired for developing the content viewer application template into the customized content viewer application. In a preferred embodiment, the back-end content management system comprises one of: a relational database and a file system.

In another aspect of the invention, there is provided a method for deriving a customized content viewer portlet from a content viewer portlet template that is ready for installation into a desired portal. The method comprises the steps of importing a content viewer portlet template into a workbench, implementing a persistent interface component of the content viewer portlet template for connecting to and retrieving data from a different back-end content management system, modifying a current set of data beans stored in a model component of the content viewer portlet template based on the data retrieved from the different back-end content management system, modifying a view component of the content viewer portlet template if a desired format is required for displaying content items in the desired portal, and modifying a controller component of the content viewer portlet template if a particular mode of operation is desired for the customized content viewer portlet template, such that the customized content viewer portlet is ready for installation into the desired portal. The importing step includes the step of providing a content viewer portlet template that includes a configuration page for modifying a plurality of parameters for displaying the content items, a logging interface for displaying debug messages in one or more log files, and an exception class for handling exceptions and displaying error messages in multiple languages. The implementing step includes the steps of retrieving the data stored in the different back-end content management system, converting the data retrieved into a new set of data beans, and storing the new set of data beans in the model component. The modifying a current set of data beans in the model component step includes the step of incorporating the new set of data beans into the current set of data beans and storing the new set of data beans in the model component. The different content management system comprises one of: a relational database and a file system.

In yet another aspect of the invention, there is provided a computer program product for creating a customized content viewer portlet from a content viewer portlet template for installation into a desired portal. The computer program product comprises a computer readable medium, first program instructions to implement a persistent interface component of the content viewer portlet template for retrieving data from a back-end content management system, second program instructions to modify a current set of data beans stored in a model component of the content viewer portlet template to incorporate the data retrieved from the back-end content management system, third program instructions to modify a view component of the content viewer portlet template if a specific format is desired for displaying content items in the desired portal when the customized content viewer portlet is installed in the desired portal. The computer program product further comprises a fourth program instructions to modify a controller component of the content viewer portlet template if a particular mode of operation is desired when the customized content viewer portlet is installed into the desired portal. Preferably, the first, second, third and fourth program instructions are stored on the medium. Preferably, the first program instructions include instructions to import the content viewer portlet template into a workbench for creating the customized content viewer portlet. Further, the first program instructions include instructions to convert the data into a new set of data beans and to store the new set of data beans in the model component. Moreover, the second program instructions include instructions to incorporate the new set of data beans into the current set of data beans for storage in the model component. Preferably, the back-end content management system comprises one of: a relational database and a file system.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 9 is a flowchart depicting a method for developing a content viewer portlet template into a customized content viewer portlet, in accordance with an embodiment of the present invention.

BEST MODE FOR CARRYING OUT THE INVENTION

Figure 1:
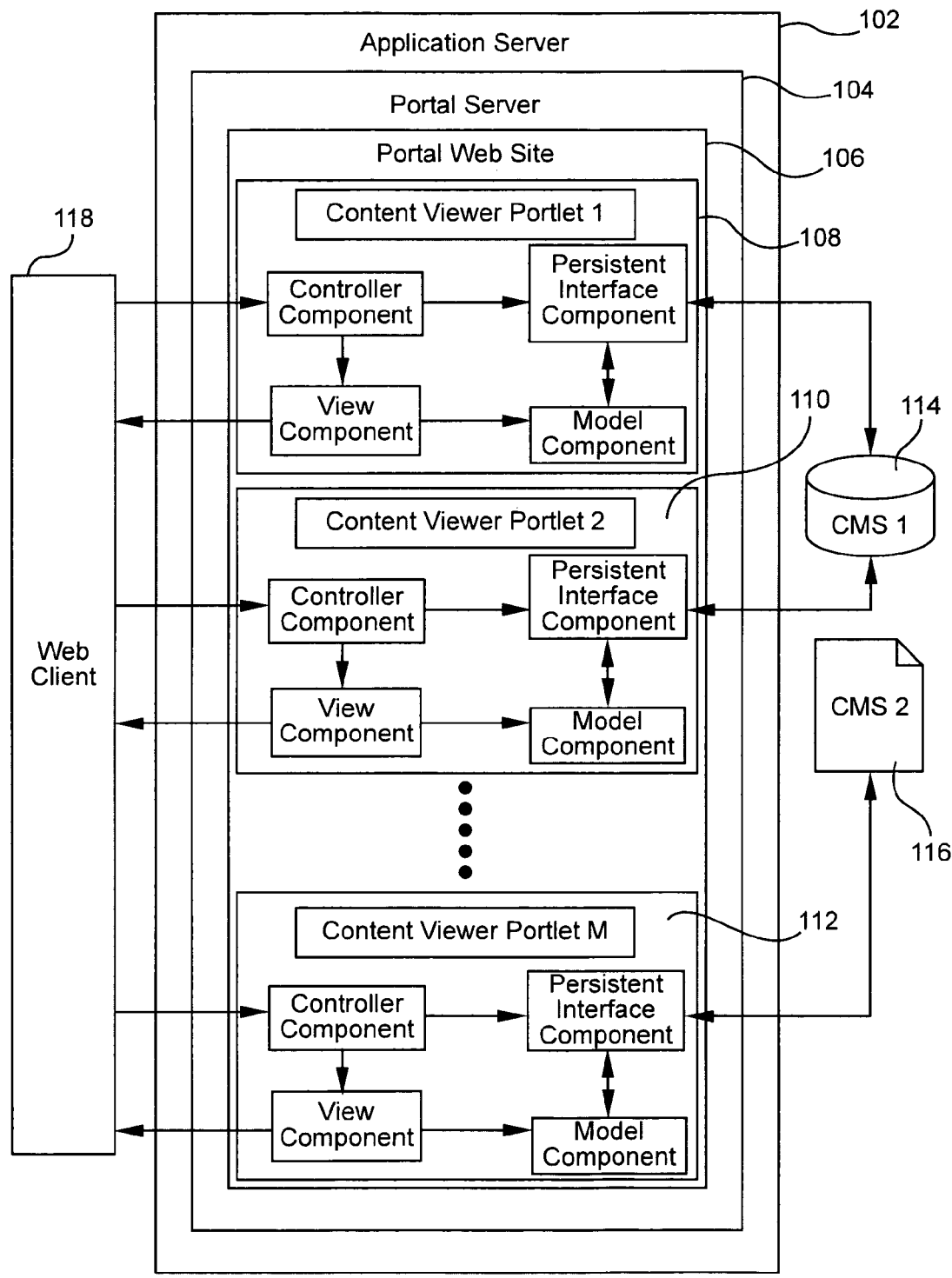
FIG. 1 is a schematic block diagram illustrating content viewer portlets, in accordance with an embodiment of the present invention.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

In one embodiment, the present invention provides a system for creating a customized content viewer portlet from a content viewer portlet template, such that the content viewer portlet template is transformed into a customized content viewer portlet that is designed for installation into a desired portal web site. The system comprises a workbench and a content viewer portlet template that is imported into the workbench. Preferably, the workbench is a computer development tool that is employed to create, debug and build a content viewer portlet using the content viewer portlet template. In a preferred embodiment, the content viewer portlet template comprises a persistent interface component, a model component, a view component and a controller component. The controller component of the content viewer portlet template is coupled to the persistent interface component and the view component, and the model component of the content viewer portlet template is coupled to the persistent interface component. Preferably, the controller component is configured to receive a user request and is configured to invoke a plurality of methods or executable codes to be executed by either the persistent interface component or the view component in response to the user request. In a preferred embodiment, the persistent interface component of the content viewer portlet template is configured to connect to and retrieve the requested data from a back-end content management system. Preferably, the model component of the content viewer portlet template has an internal computational representation that correlates to an external taxonomy in a plurality of content management areas. More preferably, the internal computational representation within the model component is composed of a current set of data beans, such that the model component is able to incorporate the requested data retrieved by the persistent interface component from the back-end content management system into the current set of data beans. Preferably, the model component incorporates the new set of data beans into the current set of data beans, such that the requested data retrieved from the back-end content management system is stored within the model component. Furthermore, the view component of the content viewer portlet template, which is coupled to the model component is configured to retrieve the requested data that has been incorporated into the model component in response to a user request and the view component is configured to display the requested data retrieved as one or more content items in a desired portal web site upon installation. Accordingly, the configuration of the individual components of the content viewer portlet template allows for the creation of a customized content viewer portlet that is designed for installation into a desired portal web site and can connect to a desired back-end content management system (CMS).

Preferably, the content viewer portlet template further comprises an exception class for handling exceptions and displaying error messages in multiple languages, as well as a logging interface for displaying debugging messages in one or more log files. In a preferred embodiment, the view component of the content viewer portlet template further comprises a configuration page that contains a plurality of parameters that may be modified for customizing the content viewer portlet template for installation into the desired portal. Preferably, the view component comprises a plurality of JavaServer Page (JSP) files, such that the view component executes the plurality of JavaServer Page (JSP) files for displaying the requested data retrieved as one or more content items. More preferably, any of the plurality of JSP files of the view component of the content viewer portlet template may be modified to display the one or more content items in a specific format in the desired portal. Furthermore, one or more codes of the controller component of the content viewer application template may be modified if a particular mode of operation is desired for developing the content viewer application template into the customized content viewer application.

As used in herein, the term "content management system" refers to a back-end software product that is used to manage content. Further, the term "portlet" refers to information or content items displayed within a region of a portal web site. More particularly, a portlet is a component of a portal web site and is a smaller web application that runs on a portal server. As such, a portal web site can have none, one or many such portlets. If a portal has more than one portlet, these portlets can connect to the same content management systems, or they can connect to different content management systems, depending on the business requirements. The term "content viewer portlet" or "customized content viewer portlet" is used to refer to a customized content viewer portlet that is derived, developed or created from a content viewer portlet template and which is designed to facilitate installation into a portal web site for displaying content in a portlet. In particular, a content viewer portlet is required to access contents from a back-end content management system and to display contents in a portlet within a portal. Further, the term "content viewer portlet template" or "customizable content viewer portlet template" is used herein to refer to the generic or customizable content viewer portlet template that is used to derive, create or develop a customized content viewer portlet that is ready for installation into a desired portal web site when creating a new portlet. Moreover, the term "desired portal" or "desired portal site" or "desired portal web site" is used to refer to a particular portal web site that connects to a particular back-end content management system and resides on a particular portal server, preferably, a commercially available portal server, such as, the WebSphere® portal server that is commercially available from International Business Machines (IBM). Further, as used herein, the term "requested data" is used to refer to data requested by a user in a portal web site. Furthermore, as used herein, the term "category data beans" is used to refer to Java Beans that contain information or data corresponding to a category in a content management system and the term "document data beans" is used to refer to Java Beans that contain information or data corresponding to a document associated with one or more categories in a content management system. Finally, as used herein, the term "current set of data beans" refers to the data beans already existing in the model component, whereas the term "new set of data beans" refers to the data that is retrieved from a content management system and stored in the model component.

Reference is now made to FIG. 1. FIG. 1 depicts a content viewer portlet system or infrastructure 100 that is made up of an application server 102, a portal server 104, and a portal web site 106. The portal web site 106 has content viewer portlet 1, numeral 108, content viewer portlet 2, numeral 110, all the way to content viewer portlet M, numeral 112. A user request from a web client 118 may be transmitted, depending on the content items requested, to the controller component of content viewer portlet 1, content viewer portlet 2 or content viewer portlet M. Further, the corresponding user response may be transmitted from the view component of content viewer portlet 1, content viewer portlet 2 or content viewer portlet M. As shown in FIG. 1, both content viewer portlet 1 and content viewer portlet 2 are configured to connect to the content management system (CMS 1), designated by numeral 114, whereas, the content viewer portlet M is configured to connect to the content management system (CMS 2), designated by numeral 116. In particular, it is the persistent interface component of the content viewer portlet 1, content viewer portlet 2 or content viewer portlet M that interfaces with or connects with the respective content management systems, CMS 1 and/or CMS 2. Referring to the content viewer portlet 1 in FIG. 1, numeral 108, the controller component 108a is coupled or linked to the view component 108b and the persistent interface component 108c. The view component 108b is coupled to the model component 108d. Further, the persistent interface component 108c is coupled to the model component 108d. The relationship between these four components will be explained herein below with respect to FIG. 3.

Figure 2:
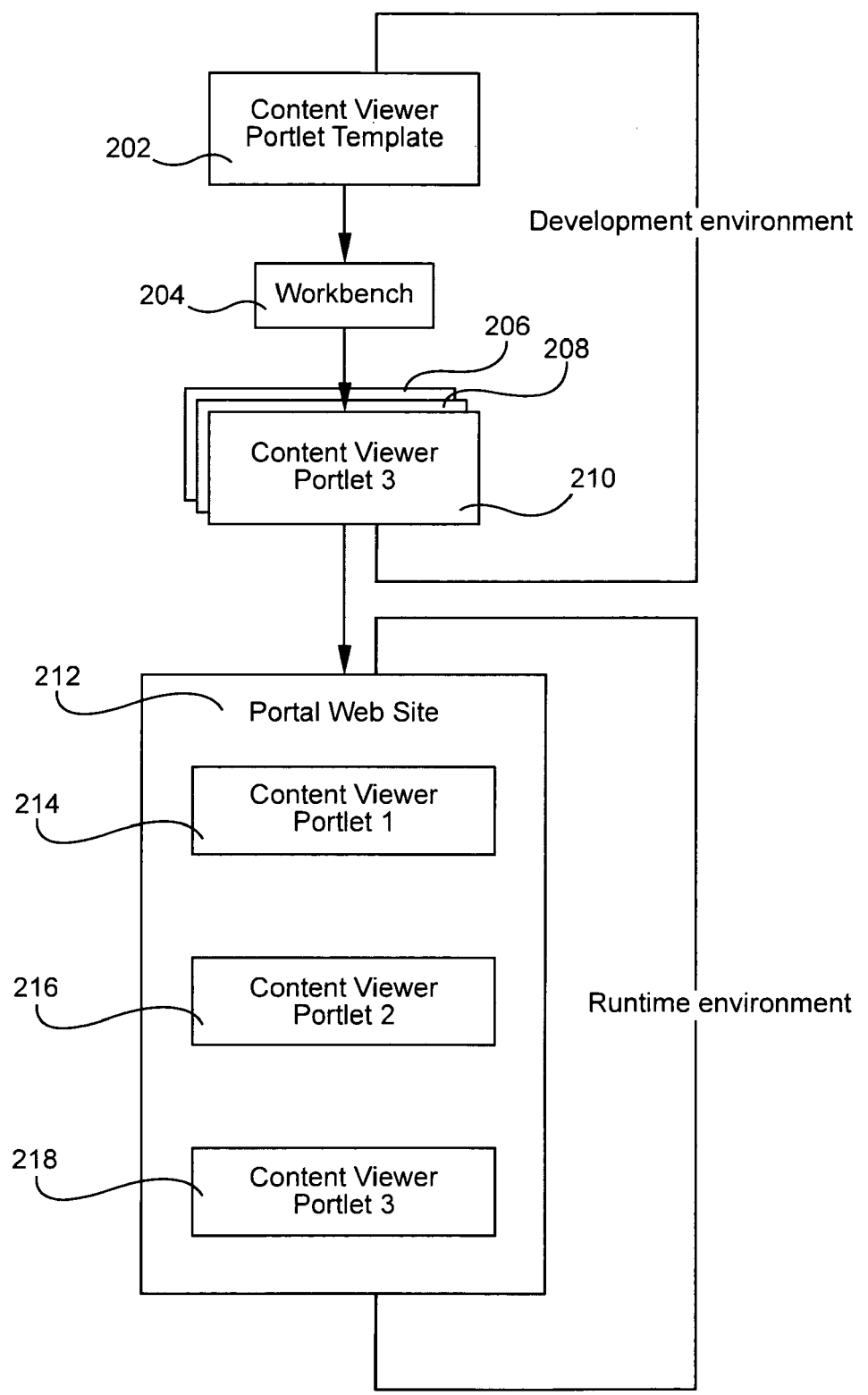
FIG. 2 is a schematic block diagram illustrating a system for creating one or more customized content viewer portlets from a content viewer portlet template that are installed into a portal web site, in accordance with an embodiment of the present invention.

However, turning to FIG. 2, FIG. 2 depicts a system 200 for creating one or more customized content viewer portlets from a content viewer portlet template that are installed into a portal web site, In particular, a developer that wants to create a content viewer portlet begins with a content viewer portlet template 202 that is imported into a workbench 204. The developer develops new codes and/or modifies the existing codes of the content viewer portlet template, such that one or more customized content viewer portlets can be created from the content viewer portlet template depending on the specific requirements of the content viewer portlet that the developer wants to create. As shown in FIG. 2, the developer has created three content viewer portlets, namely content viewer portlet 1, numeral 206, content viewer portlet 2, numeral 208 and content viewer portlet 3, numeral 210. After the developer has created the content viewer portlets 206, 208 and 210, the content viewer portlets can be installed as portlets (designated by numerals 214, 216 and 218) into a portal web site, designated as numeral 212, residing on a portal server (not shown in FIG. 2).

Figure 3:
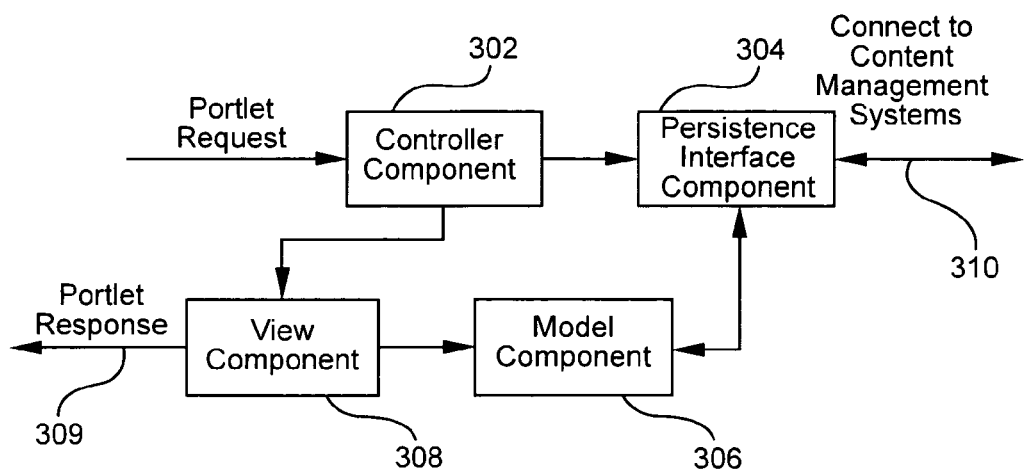
FIG. 3 is a schematic block diagram illustrating a content viewer portlet template, in accordance with an embodiment of the present invention.

Turning to FIG. 3, FIG. 3 depicts a content viewer portlet template 300. As shown in FIG. 3, the content viewer portlet template 300 comprises of a controller component 302, which is coupled or linked directly to both a persistent interface component 304 and a view component 308. Further, the view component 308 is coupled to the model component 306, and the persistent interface component 304 is coupled to the model component 306. When a user request is made pertaining to requested data in a portlet (shown by the incoming arrow 301), the controller component 302 determines via the view component 308 whether the requested data is available or already stored in the model component 306. In particular, the controller component 302 invokes one of a plurality of methods or program codes to be executed by the view component 308 in order to determine whether the model component 306 has the requested data, and if so, to retrieve the requested data from the model component 306. Further, the view component 308 responds (shown by the outgoing arrow 309) by displaying the requested data retrieved from the model component 306 as one or more content items. On the contrary, if the controller component 302 determines via the view component 308 that the model component 306 does not contain the requested data pertaining to the user request, the controller component 302 invokes another one of the plurality of methods or program codes to be executed by the persistent interface component 304 in order to be able to connect to and retrieve the information pertaining to the requested data (as shown by the double-sided arrow 310) from a back-end content management system (not shown in FIG. 3). The persistent interface component 304 retrieves the appropriate information for the requested data and stores the requested data in the model component 306.

Figure 4:
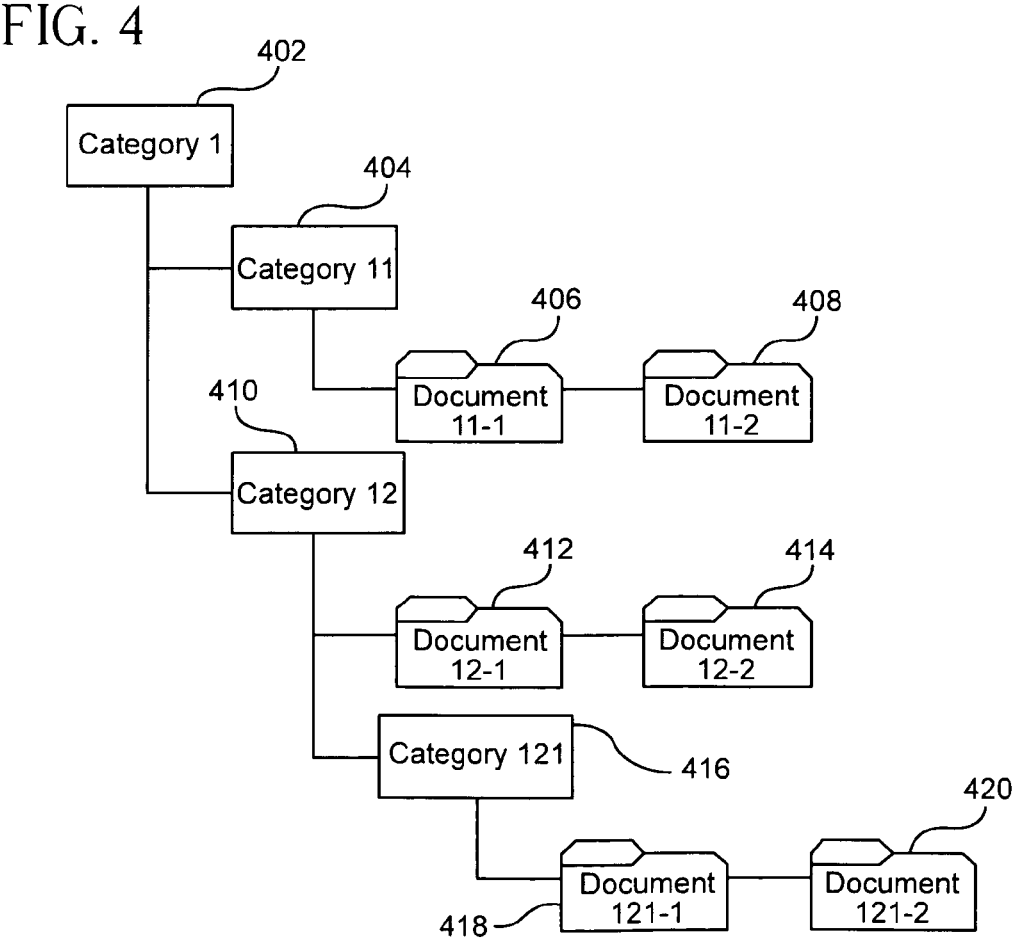
FIG. 4 is a schematic block diagram illustrating a taxonomy tree structure of a content management system, in accordance with an embodiment of the present invention.

As mentioned herein above, the model component has an internal computational representation that correlates to an external taxonomy in a plurality of content management areas. In particular, a taxonomy represents the way information is converted into well organized and intuitive classifications. Typically, the taxonomy is presented as a tree structure, such as the taxonomy tree structure 400 depicted in FIG. 4. A content management system has an implementation of a taxonomy tree to categorize different ideas and to organize content items so that the information can be accessed from the content management system. As such, a concept in the real world corresponds to a category in a taxonomy tree, which is represented by a main or parent node. Further, a given concept can be refined or further divided into sub-concepts. Each sub-concept that emanates from a concept is represented as a child node and is called a sub-category in a taxonomy tree. Further, content items in a content management system are classified according to these concepts and are called documents in a taxonomy tree, and where the documents are associated with one or more categories in a taxonomy tree. Thus, each category data bean is the computational representation of a category of the taxonomy tree and a concept in the real world, whereas, a document data bean is the computational representation of a document of the taxonomy tree and a file in the real world. In a content management system, each document is considered a content item, and the collection of documents is referred to as content items. Referring to FIG. 4, node 402 of the taxonomy tree represents a concept in the real world, which is called Category 1 in the taxonomy tree 400. Further, as shown in FIG. 4, Category 1 is further split into sub-categories, namely, Category 11 (numeral 404), Category 12 (numeral 410) and Category 121 (numeral 416). The content items for Category 11 (numeral 404) are referred to as documents, namely, Document 11-1 (numeral 406) and Document 11-2 (numeral 408). Similarly, the content items for Category 12 (numeral 410) are Document 12-1 (numeral 412) and Document 12-2 (numeral 414). Further, the content items for Category 121 (numeral 416) are Document 121-1 (numeral 418) and Document 121-2 (numeral 420). As shown in FIG. 4, Category 11 (numeral 404) and Category 12 (numeral 410) are children nodes of Category 1 (numeral 402) and Category 121 (numeral 416) is the child node of Category 12 (numeral 410). Moreover, Document 11-1 (numeral 406) and Document 11-2 (numeral 408) are documents that are associated with Category 11 (numeral 404), whereas Document 12-1 (numeral 412) and Document 12-2 (numeral 414) are documents that are associated with Category 12 (numeral 410).

Accordingly, when the persistent interface component retrieves data from a content management system, the persistent interface component is retrieving category data and document data. The persistent interface component then converts the category data into category data beans and the document data into category data beans. The data beans are what the data is stored in and these data beans form the elements of the model component. In particular, the category data beans and the document data beans retrieved from the content management system (referred to as a new set of data beans) are stored in the model component. In a preferred embodiment, the model component has an internal computational representation that is composed of a current set of data beans, thus, facilitating the incorporation of the new data beans into the current data beans stored in the model component. As such, the model component is able to incorporate the new set of data beans, which represent the requested data retrieved by the persistent interface component from the back-end content management system into the current set of data beans and is able to store the respective data beans.

Figure 5:
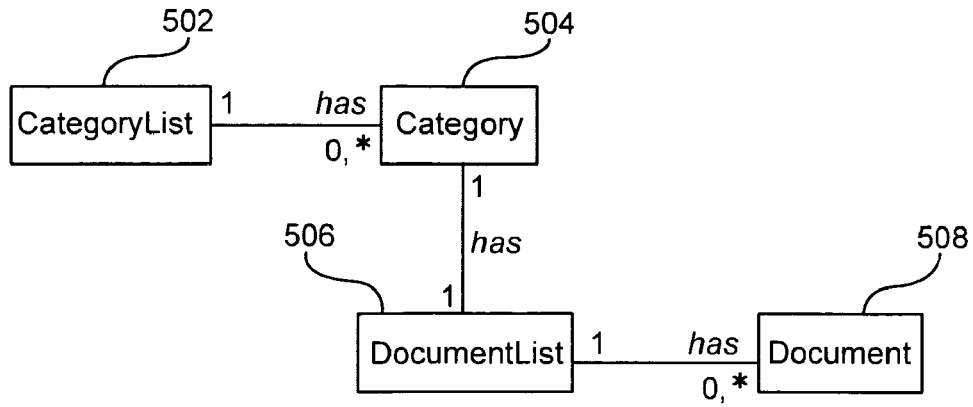
FIG. 5 is a schematic block diagram illustrating another constituent of an internal computational representation of a model component of a content viewer portlet that correlates to a taxonomy tree structure used in a content management system, in accordance with an embodiment of the present invention.
Figure 6:
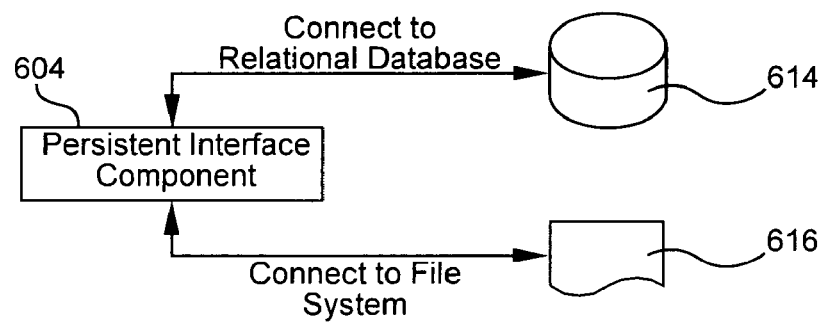
FIG. 6 is a schematic block diagram illustrating different types of content management systems that a persistent interface component of a content viewer portlet can connect to, in accordance with an embodiment of the present invention.

FIG. 5 illustrates another constituent of an internal computational representation of a model component of a content viewer portlet that correlates to a taxonomy tree structure used in a content management system. The model component maintains a list of all the categories stored in the model component. Similarly, the model component of the content viewer portlet template maintains a list of all the documents associated with each category stored in the model component. In particular, as shown in FIG. 5, the model component of the content viewer portlet template maintains an internal data structure referred to as a CategoryList, designated numeral 502, to map a taxonomy tree structure to the real world. The CategoryList 502 is a List class in the Java programming language. Further, each element of the list CategoryList 502 is a Category class 504. Thus, the list CategoryList 502 can have zero or more Category instances 504, as shown in FIG. 5. Further, each Category class 504 maintains a DocumentList 506, which is a Java List class also. An element of the list DocumentList 506 is a Document class. 508 The list DocumentList 506 can have zero and more Document instances 508. CategoryList and DocumentList are also elements of a model component. As such, a CategoryList links the different category data beans as a list, each element of this CategoryList is a category data bean. Similarly, a DocumentList links the different document data beans as a list, each element of this DocumentList is a document data bean. These Category and Document classes are the respective category and document data beans in the Model component of the content viewer portlet template, which represent the concepts or the sub-concepts and the contents or files represented in the taxonomy tree structure, respectively. In particular, the model component is composed of a CategoryList, a category data bean, DocumentList and document data bean. As such, different content management systems may implement the taxonomy differently. For example, some content management systems use relational databases to store information, and the others apply file systems. As shown in FIG. 6, the persistent interface component 604 of a content viewer portlet template 600 is configured to connect to either a relational database 614 or a file system 616 and to retrieve information stored on the respective content management systems 614 or 616. Accordingly, although different applications and different projects may construct the contents of the taxonomy tree differently for a given back-end content management system, the structure of the taxonomy tree for a given back-end content management system remains the same. This is significant in that the content viewer portlet template can be configured or designed to connect with any number of different back-end content management systems depending on the particular project. Thus, as long as a content viewer portlet template has an internal computational representation which maps the taxonomy directly in one or more content management areas, the portlet template can be used and customized by a developer for other back-end content management systems.

Figure 7:
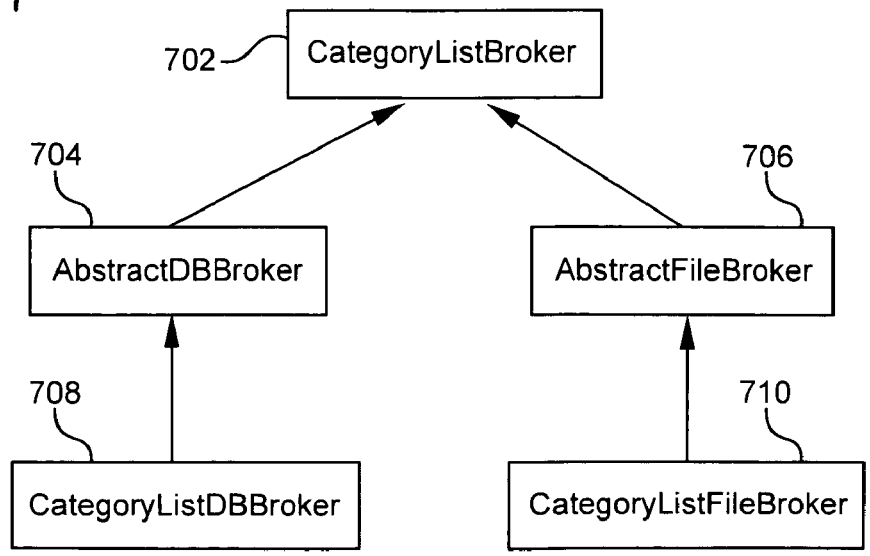
FIG. 7 is a schematic block diagram illustrating the different elements of a persistent interface component of a content viewer portlet for connecting to a content management system, in accordance with an embodiment of the present invention.

In a preferred embodiment, the Persistent Interface component is implemented as a Java package comprising of one or more Java classes, such that the codes of the persistent interface component can be easily modified to connect to different back-end content management system, where the back-end content management system can be either a relational database content management system or a file content management system. Referring to FIG. 7, when configuring the persistent interface component of a content viewer portlet template to connect to a relational database, the Java package 700 comprises of three Java classes, namely, CategoryListBroker 702, AbstractDBBroker 704 and CategoryListDBBroker 708. CategoryListBroker 702 is a top abstract class. AbstractDBBroker 704 is an abstract class too, but it extends the CategoryListBroker class 702. Further, the class CategoryListDBBroker 708 extends the AbstractDBBroker class 704 in turn. The CategoryListDBBroker class has the methods to connect to a relational database, to retrieve the data of concepts and files from one or more database tables and converts and stores them into respective Category and Document data beans in the model component. The class CategoryListBroker, which is at an abstract level of the persistent interface component, retrieves the information pertaining to categories (concepts and sub-concepts) and documents that are stored in a relational database or a file system. Since a document is attached to a category, when information about a category is retrieved, the information of a document, which is part of the category is also retrieved. Similarly, if the back-end content management system uses a file system, another abstract class AbstractFileBroker 706 is created, which also extends the CategoryListBroker class 702. In addition, the class CategoryListFileBroker 710 is created, which extends the AbstractFileBroker class 706. The AbstractFileBroker and the CategoryListBroker classes perform the same function as the AbstractDBBroker and the CategoryListDBBroker class, respectively, but with respect to a file system rather then a relational database. The AbstractDBBroker level, although still an abstract level, is one step closer compared to CategoryListBroker, since it interfaces with a database, whereas the CategoryListDBBroker contains codes that implement the interface. Each of the CategoryListDBBroker (for a relational database) and the CategoryListFileBroker (for a file system) contains the methods (executable code) to connect to the respective content management systems and to retrieve data (from the categories and documents) and to convert and store the data into the category and document data beans, respectively.

Figure 8:
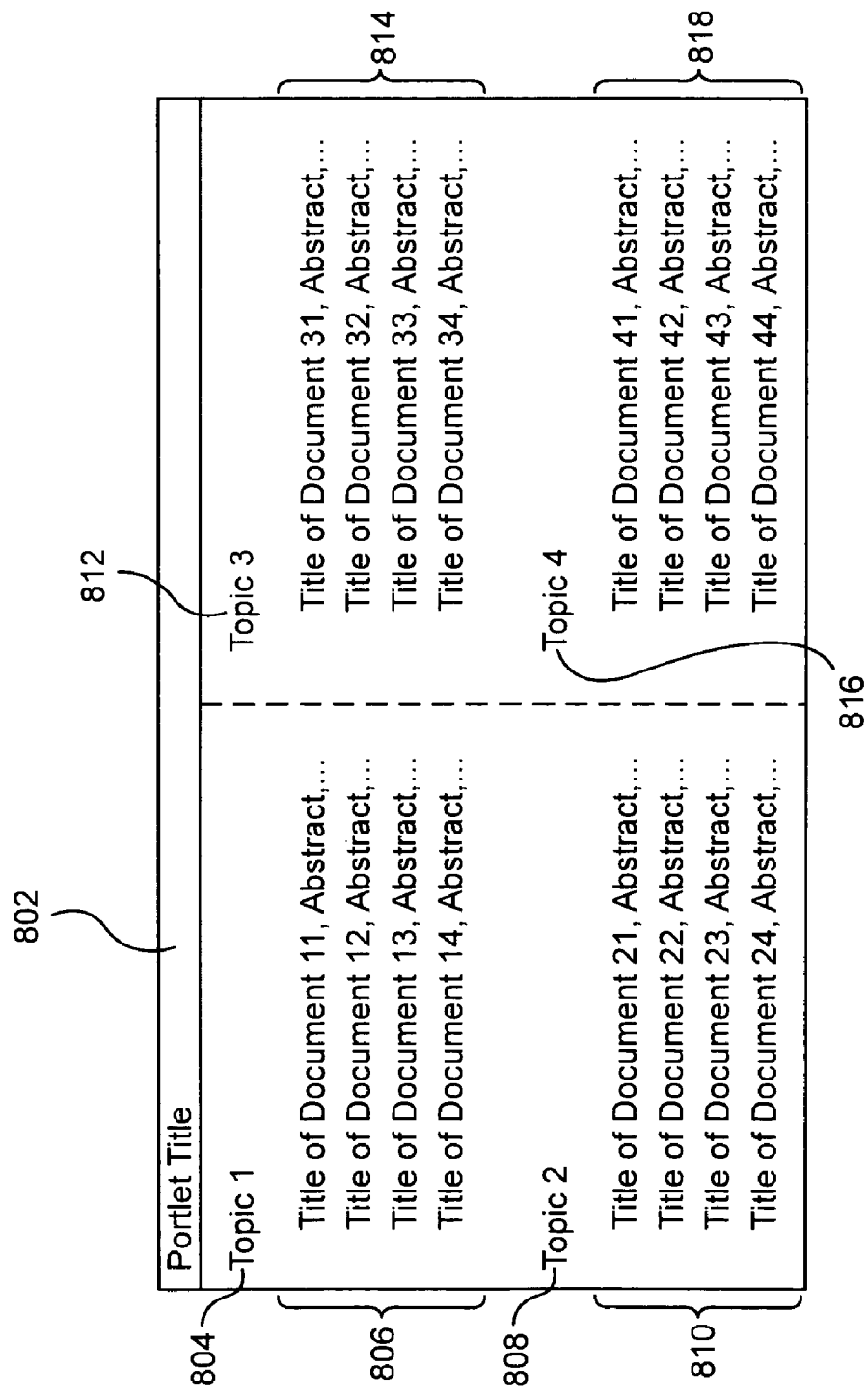
FIG. 8 is a schematic block diagram illustrating a display page with content items displayed by a view component of a content viewer portlet, in accordance with an embodiment of the present invention.

FIG. 8 illustrates a display page with content items displayed by a view component of a content viewer portlet. Once the persistent interface component has retrieved the contents and saves them into data beans of the model component, the view component can get data from the data beans and then display the content items. Although the design of displaying content items varies from one portal web site to another, in the outline page, concepts and sub-concepts are presented as topics, and each topic is followed by title lines, and this title line may contain content title, abstract text and so forth, as shown in FIG. 8. In particular, a document is stored in a document data bean of the model component as many smaller elements such as a document title, document author, a document body, a document footer, a document date, and so on. A JSP program in the view component is executed to retrieve the document data from the document data beans in the form of elements and then the view component puts these elements together as a document and displays the document by generating a view page. The content viewer portlet template provides a default format to display content items. In particular, the view component of the content viewer template consists of many files, preferably JSP files. A JSP file is a file that contains JSP programming language statements, and is used to generate view pages. In particular, if a view page is generated by a JSP file, it is referred to as a JSP page. As shown in FIG. 8, the display page 800 of a portlet has a one-to-one correspondence to the internal data structure CategoryList 502 of FIG. 5. In particular, a topic, for instance, Topic 1 (designated by numeral 804) in the display page is from the Category class 504, and each of the title lines (designated by numeral 806) is from the Document class 508. Therefore it is quite straight forward to display the content items from this CategoryList 502 of FIG. 5 into the display page 800 of a portlet. Thus, if a developer prefers a different format, the developer can modify any of the JSP files of the view component to display the content items in a specific format in the portlet. If no format change is desired, the JSP files are left as is in the content viewer portlet template. The task of modifying one or more JSP files is relatively simple and well-known in the art. Further, as mentioned herein above the view component of the content viewer portlet template further comprises a configuration page that contains a plurality of parameters that may be modified for customizing the content viewer portlet template for installation into the desired portal. A configuration page is also a JSP page. In particular, the JSP file for the configuration page is in the View Component. A configuration page allows a developer to set parameters, so that the content viewer portlet can operate according to the specific parameters set forth by the developer. Furthermore, one or more codes of the controller component of the content viewer application template may be modified if a particular mode of operation is desired for developing the content viewer application template into the customized content viewer application. As previously mentioned, the controller component of the content viewer portlet template further comprises an exception class for handling exceptions and displaying error messages in multiple languages, as well as a logging interface for displaying debugging messages in one or more log files. The Exception class is not a part of configuration page, but is part of the controller component. When a computer system experiences problems, for example, when a network is down, a hard disk is broken, etc., the Exception class sets forth the steps that the content viewer portlet is going to take in such circumstances. Further, the logging interface is also part of the controller component. In particular, logging is a way to display messages to inform a developer when, where, what is being worked on in a content viewer portlet, and to provide results, so that a developer is kept advised as to development details of the content viewer portlet.

In another embodiment, the invention provides a method for deriving a customized content viewer portlet from a content viewer portlet template, such that the customized content viewer portlet is ready for installation into a desired portal web site. The method comprises the steps of providing a content viewer portlet template and importing the content viewer portlet template into a workbench. Further, the method comprises implementing a persistent interface component of the content viewer portlet template for connecting to and retrieving data from a different back-end content management system and displaying the contents in the desired portal web site. The method further comprises the steps of modifying a current set of data beans stored in a model component of the content viewer portlet template based on the data that is retrieved from the different back-end content management system. More preferably, the implementing step includes the steps of retrieving the data stored in the different back-end content management system, converting the data retrieved into a new set of data beans, and storing the new set of data beans in the model component. In one embodiment, modifying a current set of data beans in the model component step includes the step of incorporating the new set of data beans into the current set of data beans and storing the new set of data beans in the model component. Further, the method comprises modifying a view component of the content viewer portlet template if a desired format is required for displaying content items in the desired portal or portal web site, and modifying a controller component of the content viewer portlet template if a particular mode of operation is desired for the customized content viewer portlet, such the customized content viewer portlet is ready for installation into the desired portal. Preferably, the content viewer portlet template includes a configuration page for modifying a plurality of parameters in order to display the content items in a different format. More preferably, the content viewer portlet template that is imported into the workbench includes a logging interface for displaying debug messages in one or more log files, and an exception class for handling exceptions and displaying error messages in multiple languages. In one embodiment, the different back-end content management system comprises either a relational database or a file system.

As already mentioned herein above, each time a new portlet is to be created in a portal web site to display contents, a developer has to create such a content viewer portlet, so that the content viewer portlet can connect to a content management system to retrieve contents from it and then display those contents as web pages. To develop such a content viewer portlet, a developer needs to know the interface provided by the content management system, so that the developer knows how to connect to the content management system and how to retrieve contents from it. The content viewer portlet template can be customized by a developer so that the customized content viewer portlet can connect to different content management systems and can display contents in different formats meeting specific business requirements. Thus, the content viewer portlet template facilitates the development of such a content viewer portlet that will be installed in a portal web site.

Turning to FIG. 9, numeral 900 represents a flowchart that depicts a method for deriving a customized content viewer portlet from a content viewer portlet template. The method starts at 902 with a portlet developer or portlet designer determining whether or not the developer wants to design, develop or create a new content viewer portlet for a portal web site, as shown by the decision step 904. If the developer is not planning on creating a new portlet, then the process ends at step 906. However, if the developer wants to create a new portlet, the developer imports a content viewer portlet template into a workbench in step 908 in order to customize the content viewer template. A workbench is a computer tool used by a developer to create, debug and build a portlet. In this case, the workbench allows the developer to import the content viewer portlet template and to develop a customized content viewer portlet from the template. In particular, the source codes of the content viewer portlet template are imported into a workbench, preferably, a development tool. The method further comprises determining whether or not the new portlet will connect to a different back-end content management system, as shown by the decision step 910. If the developer determines that the new portlet will not connect to a different back-end content management system in decision step 910, the developer then decides whether or not the standard format for displaying content items as set forth in the content viewer portlet template is acceptable or not in step 914. However, if the developer determines that the new portlet will connect to a different back-end content management system, then the developer modifies the persistent interface component of the content viewer portlet template in 912, so that the persistent interface component is configured to connect to and retrieve data from the different back-end content management system. In particular, the persistent interface component connects to and retrieves the category data and document data from the different back-end content management system in step 916 and converts the category data and document data into new category data beans and new document data beans, respectively, in step 918, which is stored in the model component. In particular, the model component of the content viewer portlet template stores the new category and new document data beans by incorporating the new category data beans and the new document data beans into the existing or current category data beans and the current document data beans, respectively, in step 920. Thus, after the developer has determined that the new portlet will not connect to a different back-end content management system in decision step 910 or after the developer has modified the persistent interface component of the imported content viewer portlet template in step 920, the developer then decides whether or not the standard format for displaying content items as set forth in the content viewer portlet template is acceptable or not in the decision step 914. If the standard format is not acceptable, the developer modifies the view component of the content viewer portlet template to configure the content viewer portlet template to display content in a specific desired format in step 922. If the standard format provided in the content viewer portlet template is acceptable in decision step 914 or after the developer has modified the view component of the content viewer portlet template, the developer then decides whether or not the standard mode of operation provided in the controller component of the content viewer portlet template is acceptable in decision step 924. If the standard mode of operation is acceptable, the process ends at 928. However, if the standard mode of operation is determined to be not acceptable, the developer then modifies the controller component of the content viewer portlet template to achieve a desired mode of operation in step 926, which ends the process at step 928.

In yet another embodiment of the invention, there is provided a computer program product for creating a customized content viewer portlet from a customized content viewer portlet template for installation into a desired portal web site. The computer program product comprises a computer readable or computer-usable medium, first program instructions to implement a persistent interface component of the content viewer portlet template for retrieving data from a back-end content management system, second program instructions to modify a current set of data beans stored in a model component of the content viewer portlet template to incorporate the data retrieved from the back-end content management system, and third program instructions to modify a view component of the content viewer portlet template if a specific format is desired for displaying content items in the desired portal web site when the customized content viewer portlet is installed in the desired portal web site. In another embodiment, the computer program product further comprises fourth program instructions to modify a controller component of the content viewer portlet template if a particular mode of operation is desired for the customized content viewer portlet when installed in the desired portal web site. Preferably, the first, second, third and fourth program instructions are each stored on the computer readable medium. Preferably, in one embodiment, the first program instructions include instructions to import the content viewer portlet template into a workbench for creating the customized content viewer portlet. More preferably, the first program instructions also include instructions to convert the data into a new set of data beans and to store the new set of data beans in the model component. Further, the second program instructions preferably include instructions to incorporate the new set of data beans into the current set of data beans for storage in the model component. In a preferred embodiment, the back-end content management system that the customized content viewer portlet can connect to and retrieve information from is either a relational database or a file system.

Preferably, the computer program product is in a form accessible from the computer-usable or computer-readable medium, which provides program codes or instructions for use by or in connection with a computer or any instruction execution system. For the purposes of this description, a computer-usable or computer readable medium can be any apparatus that can contain, store, communicate, propagate, or transport the codes or instructions for use by or in connection with the instruction execution system, apparatus, or device. Preferably, the medium can comprise an electronic, magnetic, optical, electromagnetic, infrared, or semiconductor system (or apparatus or device) or a propagation medium. More preferably, the computer-readable medium can comprise a semiconductor or solid state memory, magnetic tape, a removable computer diskette, a random access memory (RAM), a read-only memory (ROM), a rigid magnetic disk and an optical disk. Further, examples of optical disks include compact disc—read only memory (CD-ROM), compact disc—read/write (CD-R/W) and digital versatile/video disc (DVD).

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A system for creating a customized content viewer portlet from a content viewer portlet template, said system comprising:

a central processing unit (CPU), a computer readable memory, and a computer readable storage media;

first program instructions to instantiate a workbench;

second program instructions to instantiate a content viewer portlet template imported into said workbench;

third program instructions to instantiate a persistent interface component of said content viewer portlet template being configured to connect to and retrieve requested data from a back-end content management system;

fourth program instructions to instantiate a model component of said content viewer portlet template being coupled to said persistent interface component, said model component having an internal computational representation that correlates to an external taxonomy in a plurality of content management areas, wherein said model component incorporates said requested data retrieved from said back-end content management system into a current set of data beans;

fifth program instructions to instantiate a view component of said content viewer portlet template coupled to said model component, said view component being configured to retrieve said requested data incorporated into said model component and to display said requested data retrieved as one or more content items; and sixth program instructions to instantiate a controller component of said content viewer portlet template coupled to each of said persistent interface component and said view component, said controller component being configured to invoke a plurality of methods to be executed by each of said persistent interface component and said view component in response to a user request, such that said content viewer portlet template is transformed into said customized content viewer portlet that can be installed into a desired portal, wherein said controller component determines whether said model component has said requested data pertaining to said user request, and if said model component has said requested data, said controller component invokes one of said plurality of methods to be executed by said view component to retrieve said requested data from said model component and to display said requested data retrieved as one or more content items, and if said model component does not have said requested data pertaining to said user request, said controller component invokes another one of said plurality of methods to be executed by said persistent interface component to retrieve said requested data from said back-end content management system and to store said requested data in said model component, and wherein said first, second, third, fourth, fifth and sixth program instructions are stored on said computer readable storage media for execution by said CPU via said computer readable memory, and wherein said first, second, third, fourth, fifth, and sixth program instructions are executed on a portal server.

2. The system according to claim 1, wherein said view component of said content viewer portlet template further comprises a configuration page containing a plurality of parameters that are modifiable for customizing said content viewer portlet template for installation into said desired portal.

3. The system according to claim 1, wherein said controller component of said content viewer portlet template further comprises an exception class for handling exceptions and displaying error messages in multiple languages and a logging interface for displaying debugging messages in one or more log files.

4. The system according to claim 1, wherein said requested data retrieved from said back-end content management system comprises of concepts or sub-concepts and files; and wherein said persistent interface component converts said requested data retrieved from said back-end content management system into a new set of data beans and stores said new set of data beans in said model component.

5. The system according to claim 1, wherein said model component incorporates said new set of data beans into said current set of data beans in order to store said requested data retrieved from said back-end content management system; and wherein each of said current and new set of data beans comprises of category data beans and document data beans.

6. The system according to claim 1, wherein said view component executes a plurality of JavaServer Page (JSP) files for displaying said requested data retrieved as one or more content items, and wherein any of said plurality of JSP files of said view component of said content viewer portlet template can be modified to display said one or more content items in a specific format in said desired portal.

7. The system according to claim 1, wherein one or more codes of said controller component of said content viewer application template is modified if a particular mode of operation is desired for developing said content viewer application template into said customized content viewer application.

8. The system according to claim 6, wherein said back-end content management system comprises a relational database and a file system, wherein the persistent interface component is configured to retrieve data from either the relational database or the file system while using a same structure of a taxonomy tree used by the model component.

9. A method for deriving a customized content viewer portlet from a content viewer portlet template that is ready for installation into a desired portal, said method comprising:
 importing a content viewer portlet template into a workbench;
 implementing a persistent interface component of said content viewer portlet template for connecting to and retrieving data from a different back-end content management system;
 modifying a current set of data beans stored in a model component of said content viewer portlet template based on said data retrieved from said different back-end content management system;
 modifying a view component of said content viewer with data retrieved from said model component; and
 modifying a controller component of said content viewer portlet template if a particular mode of operation is desired for said customized content viewer portlet template, such that said customized content viewer portlet is ready for installation into said desired portal, wherein said controller component is capable of subsequently directing said view component to be returned to a web client as said desired portal, wherein said model component populates said view component with said data that is locally stored in said model component, wherein said controller component directs said persistent interface component to retrieve said data in response to said data being lacking. in said model component, and wherein said controller component, said view component, said model component and said persistent interface component are each distinct subcomponents of a single content viewer portlet on a portal server.

10. The method according to claim 9, wherein said importing step includes the step of:
 providing a content viewer portlet template that includes a configuration page for modifying a plurality of parameters for displaying said content items, a logging interface for displaying debug messages in one or more log files, and an exception class for handling exceptions and displaying error messages in multiple languages.

11. The method according to claim 9, wherein said implementing step includes the steps of:
 retrieving said data stored in said different back-end content management system;
 converting said data retrieved into a new set of data beans; and
 storing said new set of data beans in said model component.

12. The method according to claim 11, wherein said modifying a current set of data beans in said model component step includes the step of:
 incorporating said new set of data beans into said current set of data beans and storing said new set of data beans in said model component.

13. The method according to claim 11, wherein said different content management system comprises one of: a relational database and a file system.

14. A computer program product for creating a customized content viewer portlet from a content viewer portlet template for installation into a desired portal, said computer program product comprising:
 a tangible computer readable storage medium;
 first program instructions to implement a persistent interface component of said content viewer portlet template for retrieving data from a back-end content management system;
 second program instructions to modify a current set of data beans stored in a model component of said content viewer portlet template to incorporate said data retrieved from said back-end content management system;
 third program instructions to modify a view component of said content viewer portlet template with data from a modified said current set of data beans from said model component, wherein said view component, said model component and said persistent interface component are each distinct subcomponents of a single content viewer portlet; and
wherein said first, second and third program instructions are stored on said tangible computer readable storage medium.

15. The computer program product according to claim 14, further comprising:
 fourth program instructions to modify a controller component of said content viewer portlet template if a particular mode of operation is desired when said customized content viewer portlet is installed into said desired portal.

16. The computer program product according to claim 14, wherein said first program instructions include instructions to import said content viewer portlet template into a workbench for creating said customized content viewer portlet.

17. The computer program product according to claim 14, wherein said first program instructions include instructions to convert said data into a new set of data beans and to store said new set of data beans in said model component.

18. The computer program product according to claim 17, wherein said second program instructions include instructions to incorporate said new set of data beans into said current set of data beans for storage in said model component.

19. The computer program product according to claim 17, wherein said back-end content management system comprises one of: a relational database and a file system.

* * * * *